United States Patent
Ganapathi et al.

(10) Patent No.: US 10,401,816 B2
(45) Date of Patent: Sep. 3, 2019

(54) LEGACY CONTROL FUNCTIONS IN NEWGEN CONTROLLERS ALONGSIDE NEWGEN CONTROL FUNCTIONS

(71) Applicant: Honeywell International Inc., Morris Plains, NJ (US)

(72) Inventors: Ramakrishnan Ganapathi, Bangalore (IN); Shylaja Munihanumaiah, Bangalore (IN); Dhanalakshmi Saravanan, Bangalore (IN); James Schreder, Lansdale, PA (US)

(73) Assignee: Honeywell International Inc., Morris Plains, NJ (US)

( * ) Notice: Subject to any disclaimer, the term of this patent is extended or adjusted under 35 U.S.C. 154(b) by 33 days.

(21) Appl. No.: 15/655,642

(22) Filed: Jul. 20, 2017

(65) Prior Publication Data
US 2019/0025788 A1 Jan. 24, 2019

(51) Int. Cl.
*G06F 19/00* (2018.01)
*G05B 19/042* (2006.01)

(52) U.S. Cl.
CPC .......... *G05B 19/0426* (2013.01); *G05B 2219/23424* (2013.01)

(58) Field of Classification Search
CPC ....... G06F 3/048; H04W 28/12; H04B 7/0452
See application file for complete search history.

(56) References Cited

U.S. PATENT DOCUMENTS

| | | |
|---|---|---|
| 4,679,189 A | 7/1987 | Olson et al. |
| 5,537,414 A | 7/1996 | Takiyasu et al. |
| 5,566,356 A | 10/1996 | Taketsugu |
| 5,664,195 A | 9/1997 | Chatterji |
| 5,708,828 A * | 1/1998 | Coleman .......... G06F 17/30569 707/E17.006 |
| 5,749,053 A | 5/1998 | Kusaki et al. |
| 5,764,955 A | 6/1998 | Doolan |
| 5,898,826 A | 4/1999 | Pierce et al. |
| 6,141,769 A | 10/2000 | Petivan et al. |
| 6,192,232 B1 | 2/2001 | Iseyama |

(Continued)

OTHER PUBLICATIONS

International Search Report and Written Opinion of the International Searching Authority for PCT Application No. PCT/US2017/036426 dated Oct. 30, 2017, 12 pages.

(Continued)

*Primary Examiner* — Kidest Bahta (57) ABSTRACT

This disclosure provides a device and method for implementing legacy and improved control functions in controllers, including but not limited to in industrial control systems and other systems. A method includes maintaining, by a device having a controller and a memory, a function library having a plurality of legacy control functions and a plurality of improved control functions. The method includes receiving a process to be executed by the controller. The method includes, when calling a function of the process, determining whether a device setting indicates that the function is to be executed by one of the plurality of improved control functions. The method includes, when the device setting indicates that the function is to be executed by one of the plurality of improved control functions, executing the function using the one of the improved control functions, and otherwise executing the function using one of the legacy control functions.

20 Claims, 3 Drawing Sheets

(56) References Cited

U.S. PATENT DOCUMENTS

| | | | |
|---|---|---|---|
| 6,247,172 B1 | 6/2001 | Dunn et al. | |
| 6,256,297 B1 | 7/2001 | Haferbeck et al. | |
| 6,286,059 B1* | 9/2001 | Sugiura | G03G 15/5075 |
| | | | 709/220 |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Cam Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,802,016 B2 | 9/2010 | Eimers-Klose et al. | |
| 7,957,321 B2 | 6/2011 | Krzyzanowski | |
| 8,108,853 B2 | 1/2012 | Bale et al. | |
| 8,239,046 B2 | 8/2012 | Koehler et al. | |
| 8,364,291 B2 | 1/2013 | Cook et al. | |
| 8,498,201 B2 | 7/2013 | Budampati et al. | |
| 8,756,412 B2 | 6/2014 | Pulini et al. | |
| 8,881,139 B1 | 11/2014 | Acacio | |
| 9,471,405 B1* | 10/2016 | Mor | G06F 17/5009 |
| 9,581,990 B2 | 2/2017 | Dold et al. | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0177150 A1 | 9/2003 | Fung et al. | |
| 2003/0212768 A1 | 11/2003 | Sullivan | |
| 2004/0010521 A1* | 1/2004 | Li | G06F 17/30569 |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0133884 A1 | 7/2004 | Zemach et al. | |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0050076 A1 | 3/2005 | Tong et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0159828 A1 | 7/2005 | Deininger et al. | |
| 2005/0198247 A1 | 9/2005 | Perry et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0061786 A1 | 3/2007 | Zhou et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0147294 A1 | 6/2007 | Bose et al. | |
| 2007/0153677 A1 | 7/2007 | McLaughlin et al. | |
| 2007/0153789 A1 | 7/2007 | Barker et al. | |
| 2007/0155423 A1 | 7/2007 | Carmody et al. | |
| 2007/0237137 A1 | 10/2007 | McLaughlin | |
| 2007/0261052 A1 | 11/2007 | Bale et al. | |
| 2007/0280178 A1 | 12/2007 | Hodson et al. | |
| 2007/0288535 A1 | 12/2007 | Shitomi et al. | |
| 2008/0043637 A1 | 2/2008 | Rahman | |
| 2008/0140844 A1 | 6/2008 | Halpern | |
| 2008/0267259 A1 | 10/2008 | Budampati et al. | |
| 2008/0273547 A1 | 11/2008 | Phinney | |
| 2008/0288766 A1* | 11/2008 | Inoue | G06F 9/455 |
| | | | 713/2 |
| 2008/0288928 A1* | 11/2008 | Bowers | G06F 8/41 |
| | | | 717/136 |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1 | 4/2009 | Chen | |
| 2009/0089030 A1 | 4/2009 | Sturrock et al. | |
| 2009/0109889 A1 | 4/2009 | Budampati et al. | |
| 2009/0119424 A1 | 5/2009 | Liu et al. | |
| 2009/0138541 A1 | 5/2009 | Wing et al. | |
| 2009/0193063 A1 | 7/2009 | Leroux et al. | |
| 2010/0042869 A1 | 2/2010 | Szabo et al. | |
| 2010/0058302 A1 | 3/2010 | Broscaru et al. | |
| 2010/0128699 A1 | 5/2010 | Yang et al. | |
| 2010/0287548 A1 | 11/2010 | Zhou et al. | |
| 2010/0313128 A1 | 12/2010 | Phillips et al. | |
| 2011/0016235 A1* | 1/2011 | Brinkmann | G06F 13/404 |
| | | | 710/8 |
| 2011/0252154 A1* | 10/2011 | Bunch | H04M 3/4217 |
| | | | 709/230 |
| 2011/0305206 A1 | 12/2011 | Junell et al. | |
| 2012/0017031 A1 | 1/2012 | Mashtizadeh et al. | |
| 2012/0101663 A1 | 4/2012 | Fervel et al. | |
| 2012/0117416 A1 | 5/2012 | McLaughlin | |
| 2012/0124240 A1 | 5/2012 | De et al. | |
| 2012/0254520 A1 | 10/2012 | Roh et al. | |
| 2013/0198437 A1 | 8/2013 | Omizo et al. | |
| 2014/0121812 A1 | 5/2014 | Rudnick et al. | |
| 2014/0123104 A1 | 5/2014 | Frohberger et al. | |
| 2014/0152103 A1 | 6/2014 | Schauer et al. | |
| 2015/0316923 A1 | 11/2015 | Strilich et al. | |
| 2015/0365492 A1 | 12/2015 | Kalan et al. | |
| 2015/0372935 A1 | 12/2015 | kervik et al. | |
| 2015/0378328 A1 | 12/2015 | Gustin et al. | |
| 2016/0062350 A1 | 3/2016 | Prall et al. | |
| 2016/0103431 A1 | 4/2016 | Ganapathi et al. | |
| 2016/0239345 A1 | 8/2016 | Rachlin | |
| 2017/0351500 A1 | 12/2017 | Rachlin et al. | |

OTHER PUBLICATIONS

Taherian et al., "Event Dissemination in Mobile Wireless Sensor Networks", 2004 IEEE International Conference on Mobile Ad-Hoc and Sensor Systems, Oct. 2004, pp. 573-575.

(56) References Cited

OTHER PUBLICATIONS

Chen et al., "Dependability Enhancement for IEEE 802.11 Wireless LAN with Redundancy Techniques," Proceedings of the 2003 International Conference on Dependable Systems and Networks, 2003, 8 pages.

Kolavennu, Presentation, "WNSIA MAC Layer", ISA SP100 Meeting, Feb. 2007, 24 pages.

Zhang et al., "A Learning-based Adaptive Routing Tree for Wireless Sensor Networks", Journal of Communications, vol. 1, No. 2, May 2006, pp. 12-21.

Sun et al., "An Efficient Deadlock-Free Tree-Based Routing Algorithm for Irregular Wormhole-Routed Networks Based on the Turn Model", Proceedings of the 2004 International Conference on Parallel Processing (ICPP'04), Aug. 2004, 10 pages.

Song, "Fault Recovery Port-based Fast Spanning Tree Algorithm (FRP-FAST) for the Fault-Tolerant Ethernet on the Arbitrary Switched Network Topology", 2001 8th IEEE International Conference on Emerging Technologies and Factory Automation, Oct. 2001, pp. 325-332.

"XYR 5000 Wireless Transmitters" Honeywell Solutions for Wireless Data Acquisition and Monitoring, Feb. 2006, 6 pages.

Communication pursuant to Article 94(3) EPC dated Apr. 2, 2009 in connection with European Patent Application No. 07 761 784.3, 9 pages.

Aiello et al., "Wireless Distributed Measurement System by Using Mobile Devices," IEEE Workshop on Intelligent Data Acquisition and Advanced Computing Systems: Technology and Applications, Sep. 2005, pp. 316-319.

International Search Report and Written Opinion of the International Searching Authority for PCT Application No. PCT/US2007/069717 dated Dec. 10, 2007, 10 pages.

International Search Report and Written Opinion of the International Searching Authority for PCT Application No. PCT/US2007/069614 dated Nov. 22, 2007, 9 pages.

International Search Report and Written Opinion of the International Searching Authority for PCT Application No. PCT/US2007/069710 dated Nov. 27, 2007, 10 pages.

International Search Report and Written Opinion of the International Searching Authority for PCT Application No. PCT/US2007/069705 dated Apr. 15, 2008, 9 pages.

Dias, "A Fieldbus Prototype for Educational Purposes", IEEE Instrumentation & Measurement Magazine, vol. 7, No. 1, Mar. 2004, pp. 24-31.

International Search Report and Written Opinion of the International Searching Authority for PCT Application No. PCT/US2006/048334 dated Jul. 5, 2007, 10 pages.

European Search Report dated Oct. 6, 2008 in connection with European Patent Application No. 08 16 1387.9, 3 pages.

Honeywell, "Universal Horizontal IO Migration Kit", SV-13-05-ENG, May 2013, 2 pages.

Oracle, "Modernize IT Infrastructure: Oracle Mainframe Rehosting", 2012, 6 pages.

Honeywell, "ELMM Enables Stepwise Migration to Experion® PKS and EUCN Technology", PN-14-17-ENG, Jul. 2014, pp. 2.

Delsing et al, "Migration of Industrial Process Control Systems into Service Oriented Architecture", 38th Annual Conference on IEEE Industrial Electronics Society, Oct. 2012, pp. 5786-5792.

Honeywell, "Programmable Logic Controller Gateway Control Functions", PL09-500, Dec. 1997, 50 pages.

Honeywell, "Enhanced Universal Control Network Specification", EUCN03-600; TPN Release R684, Jun. 2012, Revision 1, 12 pages.

Dai et al., "Migration From PLC to IEC 61499 Using Semantic Web Technologies", IEEE Transactions on Systems, Man, and Cybernetics: Systems, vol. 44, No. 3, Mar. 2014, pp. 277-291.

\* cited by examiner

LEGACY CONTROL FUNCTIONS IN NEWGEN CONTROLLERS ALONGSIDE NEWGEN CONTROL FUNCTIONS

TECHNICAL FIELD

This disclosure relates generally to controllers and their operations. More specifically, this disclosure relates to devices and methods for improving the operation of controllers.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. As controllers are replaced or upgraded, it can be important to maintain compatibility with other legacy components.

SUMMARY

This disclosure provides a device and method for implementing legacy and improved control functions in controllers, including but not limited to in industrial control systems and other systems. A method includes maintaining, by a device having a controller and a memory, a function library having a plurality of legacy control functions and a plurality of improved control functions. The method includes receiving a process to be executed by the controller. The method includes, when calling a function of the process, determining whether a device setting indicates that the function is to be executed by one of the plurality of improved control functions. The method includes, when the device setting indicates that the function is to be executed by one of the plurality of improved control functions, executing the function using the one of the improved control functions. The method includes, when the device setting does not indicate that the function is to be executed by one of the plurality of improved control functions, executing the function using one of the legacy control functions.

Disclosed embodiments include a system or device comprising a controller and a memory, configured to perform processes as described herein. Disclosed embodiments also include a non-transitory machine-readable medium encoded with executable instructions that, when executed, cause one or more processors of a system or device to perform processes as disclosed herein.

In various embodiments, the device setting is a user selection received by the device from a user. In various embodiments, the device setting is a user selection configured into the device. In various embodiments, the device setting indicates a default mode of operation of the device. In various embodiments, the legacy control functions and improved control functions are stored in a control library. In various embodiments, the legacy control functions and improved control functions are stored in a control library that is associated with a support class. In various embodiments, the device is a replacement device capable of functioning as a legacy device using the legacy control functions, and wherein the improved control functions are not supported by the legacy device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
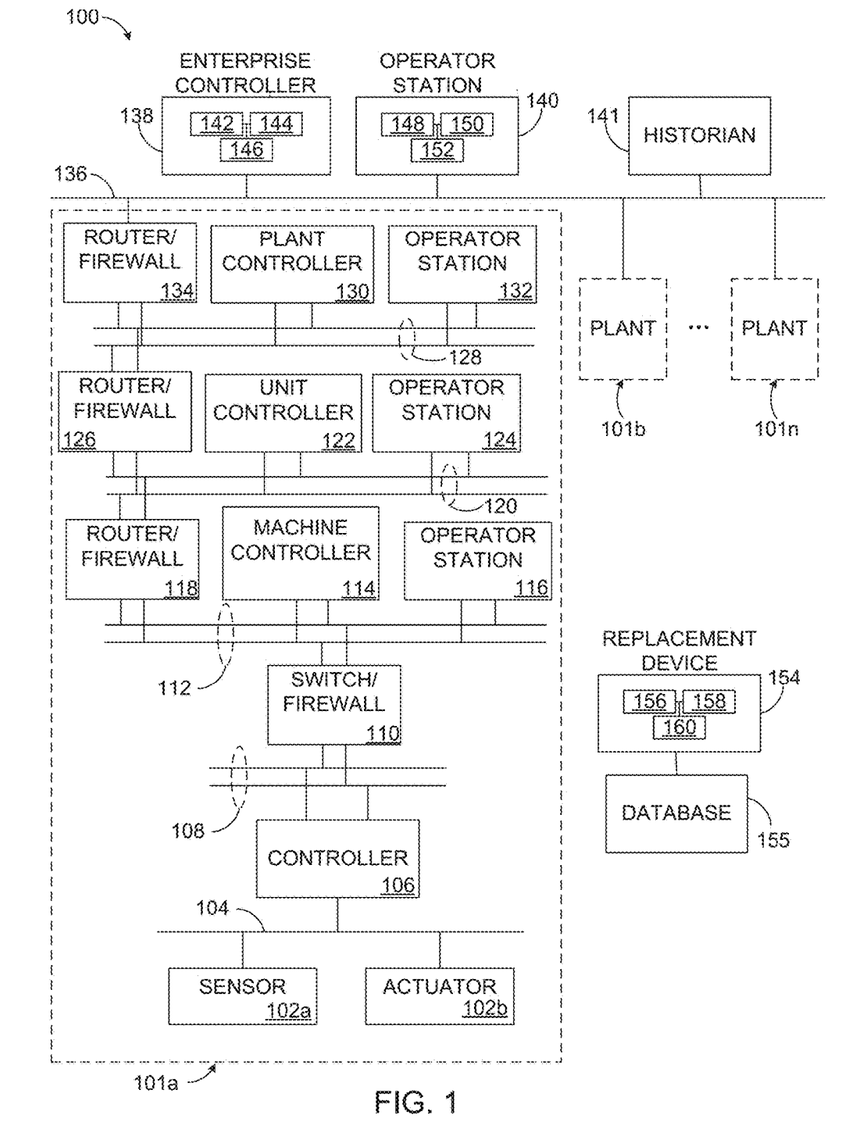
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In to addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, older or legacy controllers are replaced with or migrated to more modern ones because of obsolescence or to meet the growing, complex needs of modern control systems. The control entities like function blocks and algorithms available in legacy and modern controls are often different and warrant a large re-engineering of the entire control system along with the connected applications. This re-engineering will bring back the entire cycle of FEED (Front End Engineering Design), FAT (Factory Acceptable Test), Documentation, SAT (Site Acceptance Test) and commissioning.

In many cases, modifications that have been made to the control system and applications over time are not fully updated in the maintenance records. As a result, the engineering teams have to understand the legacy configuration and convert them into new ones applying their operation and maintenance philosophy. This becomes even more complex if the features of the legacy system and the newer control system differ greatly, which is a common case. Apart from the redundant efforts to be spent in this cycle, this complexity hikes the cost and easiness of migration and elongates the downtime during migration, and further affects the stability of the process operation. Many times, the user experience is also significantly changed and can require retraining.

Disclosed embodiments include the development of a legacy library that includes all control entities of the legacy controller which has been replaced. The control blocks stored in the legacy library will have the same control behavior, alarm functions, property/parameter names, etc. as that of the old legacy controller, adapted for use on the new controllers. This enables the user to carry forward the old configuration to the new controller under the legacy library.

The processes and results described herein can be accomplished (among other ways) using a replacement device 154. Among other things, the replacement device 154 supports a technique for using both legacy and improved control functions. Note that "replacement," in this context, refers to a device that is different, and typically new and improved, as compared to devices that only support the "legacy" control functions as described herein. The "improved" control functions or entities are typically functions that support newer, improved controllers, but can be control functions that simply differ from the legacy control functions.

In this example, the replacement device 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the replacement device 154 could be implemented using any suitable hardware or a combination of hardware and software/firmware instructions. In some embodiments, the replacement device 154 includes, or is communication with, a database 155. The database 155 denotes any suitable structure facilitating storage and retrieval of information, and in particular can be used to store one or more libraries as described herein. The replacement device 154 can be used in place of any of the other components of FIG. 1, and is called out specifically here for clarity of description.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the replacement device 154 can be used. This functionality can be used in any other suitable device or system.

Figure 2:
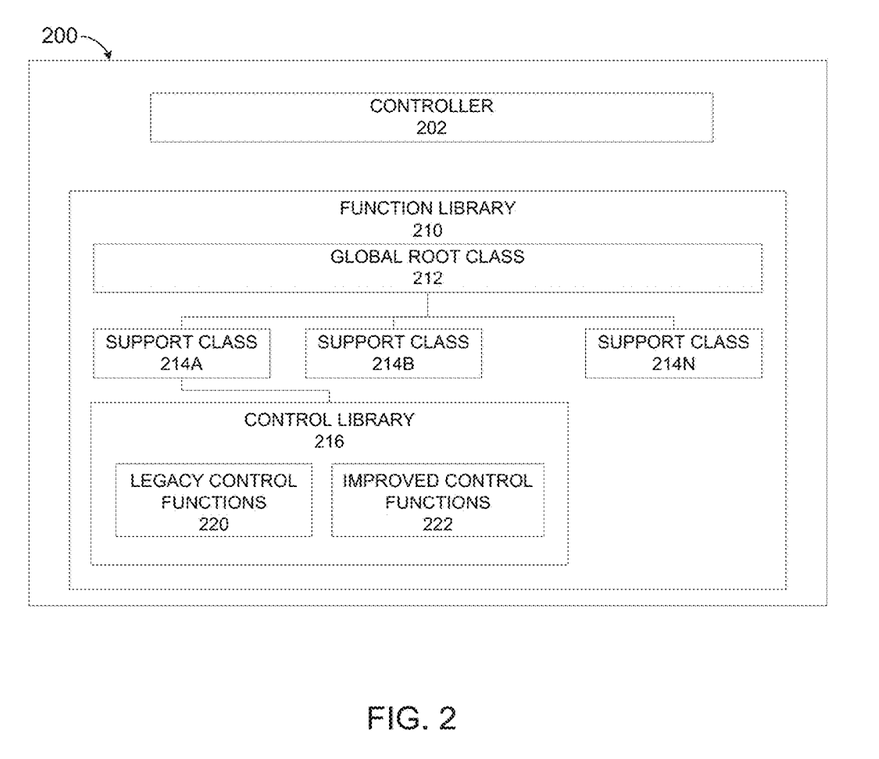
FIG. 2 illustrates an example of a replacement device and various logical elements, in accordance with disclosed embodiments.

FIG. 2 illustrates an example of a replacement device 200 and various logical elements. Replacement device 200 can be implemented as a replacement device 154 as described above. In some embodiments, such a device includes a control layer running on an operating system, and the control layer uses a function library as described herein to provide various algorithms as control entities for building control applications. A user can configure various loops using various instances of control entities or other functions. The configurations can be loaded and associated with the relevant control entities, then set to run the process control. The configuration data can be stored in any associated storage space for back up.

Replacement device 200, in this example, includes a controller 202 and a function library 210. Function library 210 can be implemented, for example as stored in a database 155 or memory 158 described above.

Function library 210 includes at least one global root class 212, for example functioning as a control kernel. The global root class 212 is linked to a plurality of support classes 214A-214N (collectively, support classes 214). Support classes 214 can be basic support classes for such processes as locks, connections, alarming, etc.

Each of the support classes 214 is linked to a control library 216 that includes legacy control functions 220 and improved control functions 222. Note that control library 216 and its elements is only shown for support class 214A, but a similar library or the same library can be used for each of the support classes 214. Each control function can be a function, function block, algorithm, process, or other executable elements. Each support class 214 can use legacy control functions 220 to support the same control behavior, alarm functions, property/parameter names, etc. as in legacy devices, but can also support additional functions, parameters, and abilities using improved control functions 222.

Replacement device 200 can execute code that identifies whether any particular process executing on replacement device 200, or any particular instruction or call from another device, should be executed using the legacy control functions 220 or the improved control functions 222. Function library 210 or control library 216 can be implemented as a single library, or can be implemented as different libraries, such as an "improved function library" for the improved control functions 222 and a "legacy function library" for the legacy control functions 220.

In some embodiments, there are legacy control functions 220 and associated improved control functions 222 that perform the same essential functions and return the same results to a given input. A difference, in this case, is that improved control functions 222 may support additional or extended parameters, take advantage of improvements in hardware or software technologies, or otherwise provide an advantage over the associated legacy control functions 220, while the legacy control functions 220 are configured to precisely emulate execution as performed on a legacy device.

The improved control functions 222 and the legacy control functions 220 can be mixed in any convenient combination in function library 210 of a given device. Adjacent control strategies built using two different libraries can be configured to pop the same error messages and exhibit the same error handling.

The parameters of associated improved and legacy control functions can have different names. Each control function can be implemented as a tagged basic block type which enables two-part parameter access.

In various embodiments, each control function can have the same naming rule for both the types and instances. Each control function can be assigned to a period of 50 milliseconds to 2 minutes. Each control function can host connections from other blocks.

In such a control library, a controller can use the saved configuration of a legacy controller to achieve an exactly same control function as in the legacy controller. The control library is built on the control execution environment of the new controller and made to work at par with the legacy controller. Also, the tag names used earlier are reused as they are. This reduces, if not totally eliminates, the changes required in the other applications.

Any communication layers or data access layers for connecting with various other elements of the replacement device can operate as in legacy devices. These can include communicating with a peer node which is either at the process control layer (L1) or at the supervisory control layer (L2) or connecting to the input/output modules. Any differential control behavior between improved control functions 222 and the legacy control functions 220 can be implemented as a discrete new block in the control library at the same level as that of any legacy block that existed legacy libraries.

Figure 3:
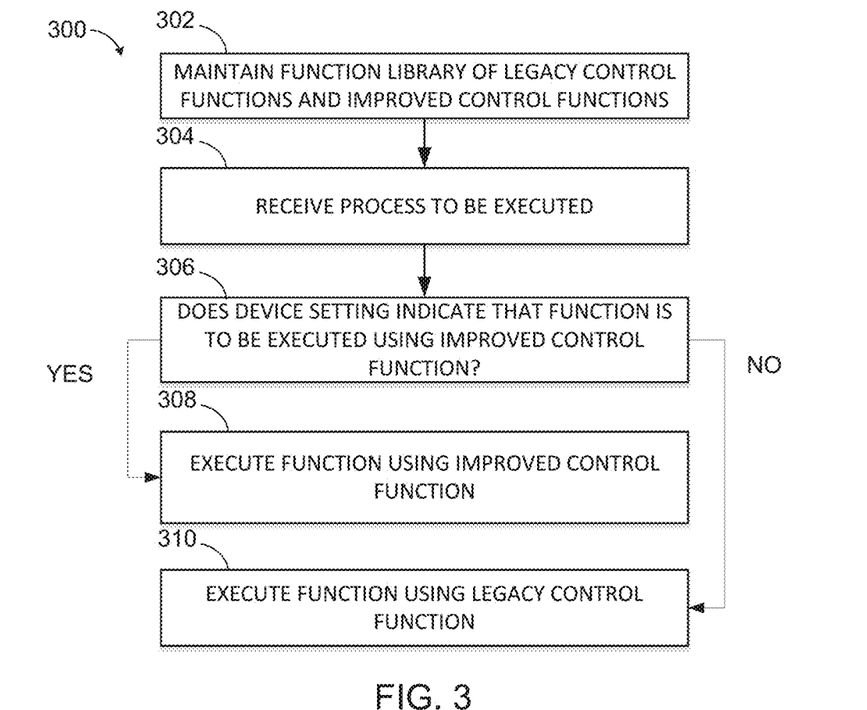
FIG. 3 illustrates a process in accordance with disclosed embodiments.

FIG. 3 illustrates a process in accordance with disclosed embodiments.

A device that includes a controller and a memory maintains a function library having a plurality of legacy control function and a plurality of improved control functions (302).

The device receives a function to be executed by the controller (304). "Receiving" can include loading from storage, receiving from another device or process, receiving via an interaction with a user, and otherwise.

When calling a function of the process to be executed, the device determines whether a device setting indicates that the function is to be executed by one of the plurality of improved control functions (306). This can include determining whether the function being executed is included as one of the improved control functions, determining whether the function being executed is based on a legacy configuration, determining whether the function being executed requires parameters, inputs, or outputs only supported by the improved control functions, or otherwise. The device setting can be a user selection that has been previously received by or configured into the device. The device setting can be specific to the current received function, or can indicate a default mode of operation of the device of either using the legacy control functions or the improved control functions (if available). The device setting can be a "soft" configuration setting, such as a bit, flag, table entry, or other indicator stored as associated with the function. The device setting can be a hardware switch or other physical configuration indicating that improved control functions should be used when available.

If the device setting indicates that the function is to be executed by one of the plurality of improved control functions, then the device executes the function using the improved control function (308). Otherwise, the device executes the function using a legacy control function (310).

Disclosed embodiments provide a number of significant advantages. For example, a legacy library as disclosed herein eliminates the need for any new rules of configuration or front-end engineering design. Further, a user will not have a need to familiarize himself with the new control system. The amount of testing required is reduced to the test of typical loops and the comparisons of configuration for the rest.

Further, stabilization and maintenance of the system using the replacement device is faster and more efficient, as the control functions resemble the old one. This reduces the downtime and hence the production loss during a migration. By leveraging the legacy library, disclosed embodiments provide significant reductions in re-engineering costs.

The techniques described herein provide for a more seamless operator experience. The tag names and the way with which the parameters are accessed by various applications are also preserved as they were. This reduces the changes required to applications like graphics because of migration. The tag names are carried forward without changes and also the remaining part of the user experience.

Newly-developed library elements can fully support any advanced applications allowing a user to carry forward all his existing applications as is, and at the same time have many more advanced control functions available.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that to different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   maintaining, by a device having a controller and a memory, a function library having a plurality of legacy control functions and a plurality of improved control functions;
   receiving a process to be executed by the controller, wherein the process includes a function, and wherein one of the plurality of legacy control functions corresponds to the function and one of the plurality of improved control functions corresponds to the function;
   when calling the function of the process, determining whether a device setting of the device indicates that the function is to be executed using the improved control function that corresponds to the function;
   when the device setting indicates that the function is to be executed using the improved control function that corresponds to the function, executing the function using the improved control function that corresponds to the function; and
   when the device setting does not indicate that the function is to be executed using the improved control function that corresponds to the function, executing the function using the legacy control function that corresponds to the function.

2. The method of claim 1, wherein the device setting is a user selection received by the device from a user.

3. The method of claim 1, wherein the device setting is a user selection configured into the device.

4. The method of claim 1, wherein device setting indicates a default mode of operation of the device.

5. The method of claim 1, wherein the function library is part of a control library.

6. The method of claim 1, wherein the function library is part of a control library that is associated with a support class.

7. The method of claim 1, wherein the device is a replacement device capable of functioning as a legacy device using one or more of the legacy control functions, and wherein the improved control functions are not supported by the legacy device.

8. A device comprising:
a controller; and
a memory, wherein the memory stores a function library having a plurality of legacy control functions and a plurality of improved control functions, the controller configured to:
receive a process to be executed, wherein the process includes a function, and wherein one of the plurality of legacy control functions corresponds to the function and one of the plurality of improved control functions corresponds to the function;
when calling the function of the process, determine whether a device setting of the device indicates that the function is to be executed using the improved control function that corresponds to the function;
when the device setting indicates that the function is to be executed using the improved control function that corresponds to the function, execute the function using the improved control function that corresponds to the function; and
when the device setting does not indicate that the function is to be executed using the improved control function, execute the function using the legacy control function that corresponds to the function.

9. The device of claim 8, wherein the device setting is a user selection received by the device from a user.

10. The device of claim 8, wherein the device setting is a user selection configured into the device.

11. The device of claim 8, wherein device setting indicates a default mode of operation of the device.

12. The device of claim 8, wherein the function library is part of a control library.

13. The device of claim 8, wherein the function library is part of a control library that is associated with a support class.

14. The device of claim 8, wherein the device is a replacement device capable of functioning as a legacy device using one or more of the legacy control functions, and wherein the improved control functions are not supported by the legacy device.

15. A non-transitory machine-readable medium encoded with a function library having a plurality of legacy control functions and a plurality of improved control functions and encoded with executable instructions that, when executed, cause one or more processors of a device to:
receive a process to be executed, wherein the process includes a function, and wherein one of the plurality of legacy control functions corresponds to the function and one of the plurality of improved control functions corresponds to the function;
when calling the function of the process, determine whether a device setting indicates that the function is to be executed using the improved control function that corresponds to the function;
when the device setting indicates that the function is to be executed using the improved control function that corresponds to the function, execute the function using the the improved control function that corresponds to the function; and
when the device setting does not indicate that the function is to be executed using the improved control function that corresponds to the function, execute the function using the legacy control function that corresponds to the function.

16. The non-transitory machine-readable medium of claim 15, wherein the device setting is a user selection received by the device from a user.

17. The non-transitory machine-readable medium of claim 15, wherein the device setting is a user selection configured into the device.

18. The non-transitory machine-readable medium of claim 15, wherein the device setting indicates a default mode of operation of the device.

19. The non-transitory machine-readable medium of claim 15, wherein function library is part of a control library.

20. The non-transitory machine-readable medium of claim 15, wherein the function library is part of a control library that is associated with a support class.

* * * * *